United States Patent
Shetty et al.

(10) Patent No.: US 10,425,287 B2
(45) Date of Patent: Sep. 24, 2019

(54) SYSTEMS AND METHODS FOR NETWORK TOPOLOGY DISCOVERY

(71) Applicant: Dell Products L.P., Round Rock, TX (US)

(72) Inventors: Sudhir Vittal Shetty, Cedar Park, TX (US); Sanjay Sane, Fremont, CA (US); Balaji Rajagopalan, Sunnyvale, CA (US); Jacob R. Hutcheson, Round Rock, TX (US); Prakash Nara, Round Rock, TX (US); Babu Chandrasekhar, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 160 days.

(21) Appl. No.: 15/441,005

(22) Filed: Feb. 23, 2017

(65) Prior Publication Data

US 2018/0241632 A1    Aug. 23, 2018

(51) Int. Cl.
  *H04L 12/24* (2006.01)
  *H04L 12/721* (2013.01)
  *H04L 12/26* (2006.01)
  *H04L 12/751* (2013.01)

(52) U.S. Cl.
  CPC .............. *H04L 41/12* (2013.01); *H04L 41/22* (2013.01); *H04L 43/10* (2013.01); *H04L 45/02* (2013.01); *H04L 45/26* (2013.01); *Y02D 30/30* (2018.01)

(58) Field of Classification Search
  None
  See application file for complete search history.

(56) References Cited

U.S. PATENT DOCUMENTS

| | | | |
|---|---|---|---|
| 5,926,463 A | 7/1999 | Ahearn et al. | |
| 6,480,955 B1 | 11/2002 | DeKoning et al. | |
| 6,731,631 B1 | 5/2004 | Chang et al. | |
| 7,020,145 B1 | 3/2006 | Symons et al. | |
| 7,640,325 B1 | 12/2009 | DeKoning et al. | |
| 7,751,405 B1* | 7/2010 | Kompella ........... | H04L 12/4633 370/254 |
| 8,443,065 B1 | 5/2013 | White | |
| 8,805,982 B1 | 8/2014 | Wilsey et al. | |
| 8,934,495 B1 | 1/2015 | Hilton et al. | |
| 9,130,870 B1 | 9/2015 | Swierk et al. | |
| 9,246,702 B1 | 1/2016 | Sharma et al. | |
| 9,286,047 B1 | 3/2016 | Avramov et al. | |
| 9,294,347 B2 | 3/2016 | Shetty et al. | |
| 9,319,335 B1 | 4/2016 | Tripathi | |
| 9,374,285 B1 | 6/2016 | Ramasubramanian et al. | |
| 9,497,080 B1 | 11/2016 | Friedman et al. | |

(Continued)

*Primary Examiner* — Jutai Kao
(74) *Attorney, Agent, or Firm* — Jackson Walker L.L.P.

(57) ABSTRACT

An information handling system may include a processor, a memory coupled to the processor, the memory having program instructions stored thereon that, upon execution by the processor, cause the processor to: (i) responsive to a physical connection being made between components of a system comprising multiple information handling system chassis, receive a message; (ii) process information present in the message indicative of a topology of connectivity among the components of the system; and (iii) update a data structure defining the topology of connectivity of the various components of the system based on the information present in the message.

20 Claims, 2 Drawing Sheets

(56) References Cited

U.S. PATENT DOCUMENTS

| | | |
|---|---|---|
| 9,571,411 B1 | 2/2017 | Shankarappa et al. |
| 9,590,854 B1 | 3/2017 | Shekhar et al. |
| 9,661,022 B2 | 5/2017 | Shetty et al. |
| 9,935,831 B1 | 4/2018 | Wundsam et al. |
| 9,942,144 B1 | 4/2018 | Ramalingam et al. |
| 10,097,457 B1 | 10/2018 | Srinivasan et al. |
| 2002/0085551 A1 | 7/2002 | Tzeng |
| 2002/0156888 A1 | 10/2002 | Lee et al. |
| 2003/0091042 A1 | 5/2003 | Lor |
| 2003/0130833 A1 | 7/2003 | Brownell et al. |
| 2007/0115962 A1 | 5/2007 | Mammoliti et al. |
| 2008/0219184 A1 | 9/2008 | Fowler et al. |
| 2008/0310421 A1 | 12/2008 | Teisberg et al. |
| 2009/0063666 A1 | 3/2009 | Scholz et al. |
| 2009/0189774 A1 | 7/2009 | Brundridge et al. |
| 2010/0122175 A1 | 5/2010 | Gupta et al. |
| 2010/0157516 A1 | 6/2010 | Doorhy et al. |
| 2010/0211664 A1 | 8/2010 | Raza et al. |
| 2011/0279266 A1 | 11/2011 | Nolterieke et al. |
| 2011/0299413 A1 | 12/2011 | Chatwani et al. |
| 2012/0002670 A1 | 1/2012 | Subramanian et al. |
| 2012/0079101 A1 | 3/2012 | Muppala et al. |
| 2012/0079139 A1 | 3/2012 | Sonokawa et al. |
| 2012/0207039 A1 | 8/2012 | Srinivasan et al. |
| 2013/0148511 A1 | 6/2013 | Banga et al. |
| 2013/0148654 A1 | 6/2013 | Sayani et al. |
| 2013/0250810 A1 | 9/2013 | Ho et al. |
| 2014/0006597 A1 | 1/2014 | Ganguli et al. |
| 2014/0036924 A1 | 2/2014 | Christenson |
| 2014/0086099 A1* | 3/2014 | Li ............ H04L 69/324 370/254 |
| 2014/0101467 A1 | 4/2014 | Jubran et al. |
| 2014/0105029 A1 | 4/2014 | Jain et al. |
| 2014/0126424 A1 | 5/2014 | Nguyen et al. |
| 2014/0215027 A1 | 7/2014 | Janardhanan |
| 2014/0226461 A1 | 8/2014 | Hashimoto et al. |
| 2014/0269299 A1* | 9/2014 | Koornstra ........ H04L 41/0816 370/235 |
| 2014/0379817 A1* | 12/2014 | Logue ............... G06Q 10/107 709/206 |
| 2015/0081829 A1 | 3/2015 | Maity et al. |
| 2015/0095530 A1 | 4/2015 | Kumbhari et al. |
| 2015/0124837 A1 | 5/2015 | Saltsidis et al. |
| 2015/0188760 A1 | 7/2015 | Anumala et al. |
| 2015/0188808 A1 | 7/2015 | Ghanwani et al. |
| 2015/0200803 A1 | 7/2015 | Kashyap et al. |
| 2015/0236921 A1 | 8/2015 | Doorhy et al. |
| 2015/0256413 A1 | 9/2015 | Du et al. |
| 2015/0271022 A1 | 9/2015 | Seligson et al. |
| 2015/0326502 A1 | 11/2015 | Namihira |
| 2015/0334001 A1 | 11/2015 | Sato |
| 2016/0006619 A1 | 1/2016 | Maity et al. |
| 2016/0006620 A1 | 1/2016 | Maity et al. |
| 2016/0014073 A1 | 1/2016 | Reddy et al. |
| 2016/0094461 A1 | 3/2016 | Shetty et al. |
| 2016/0124477 A1 | 5/2016 | Guy et al. |
| 2016/0179556 A1* | 6/2016 | McGowan ........... G06F 21/73 710/104 |
| 2016/0182284 A1 | 6/2016 | Ayanam et al. |
| 2016/0191314 A1 | 6/2016 | Russell et al. |
| 2016/0212041 A1 | 7/2016 | Krishnamurthy |
| 2016/0226704 A1 | 8/2016 | Astigarraga et al. |
| 2017/0026232 A1 | 1/2017 | Janardhanan |
| 2017/0034000 A1 | 2/2017 | Gopalarathnam et al. |
| 2017/0054603 A1 | 2/2017 | Kulkarni et al. |
| 2017/0078150 A1 | 3/2017 | Koganti et al. |
| 2017/0118041 A1 | 4/2017 | Bhattacharya et al. |
| 2017/0126490 A1 | 5/2017 | Berly et al. |
| 2017/0214595 A1 | 7/2017 | Johnsen et al. |
| 2017/0214600 A1 | 7/2017 | Moxnes et al. |
| 2017/0230065 A1 | 8/2017 | Saraswathyama et al. |
| 2017/0302529 A1* | 10/2017 | Agarwal ............ H04L 67/1097 |
| 2017/0317899 A1* | 11/2017 | Taylor .............. H04L 43/062 |

\* cited by examiner

SYSTEMS AND METHODS FOR NETWORK TOPOLOGY DISCOVERY

TECHNICAL FIELD

The present disclosure relates in general to information handling systems, and more particularly to providing for network topology discovery in a system comprising multiple information handling system chassis.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a system comprising multiple information handling system chassis, the various chassis may be of different types and may be cabled and wired together in a particular manner. A console for managing the system may need to determine the connectivity among the various chassis and components internal to the chassis in order to determine a topology of the system.

SUMMARY

In accordance with the teachings of the present disclosure, certain disadvantages and problems associated with determining a topology in a multi-chassis environment have been reduced or eliminated.

In accordance with embodiments of the present disclosure, an information handling system may include a processor, a memory coupled to the processor, the memory having program instructions stored thereon that, upon execution by the processor, cause the processor to: (i) responsive to a physical connection being made between components of a system comprising multiple information handling system chassis, receive a message; (ii) process information present in the message indicative of a topology of connectivity among the components of the system; and (iii) update a data structure defining the topology of connectivity of the various components of the system based on the information present in the message.

In accordance with these and other embodiments of the present disclosure, a method may include responsive to a physical connection being made between components of a system comprising multiple information handling system chassis, receiving a message. The method may further include processing information present in the message indicative of a topology of connectivity among the components of the system. The method may also include updating a data structure defining the topology of connectivity of the various components of the system based on the information present in the message.

In accordance with these and other embodiments of the present disclosure, an article of manufacture may include a non-transitory computer readable medium and computer-executable instructions carried on the computer readable medium, the instructions readable by a processor, the instructions, when read and executed, for causing the processor to: (i) responsive to a physical connection being made between components of a system comprising multiple information handling system chassis, receive a message; (ii) process information present in the message indicative of a topology of connectivity among the components of the system; and (iii) update a data structure defining the topology of connectivity of the various components of the system based on the information present in the message.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
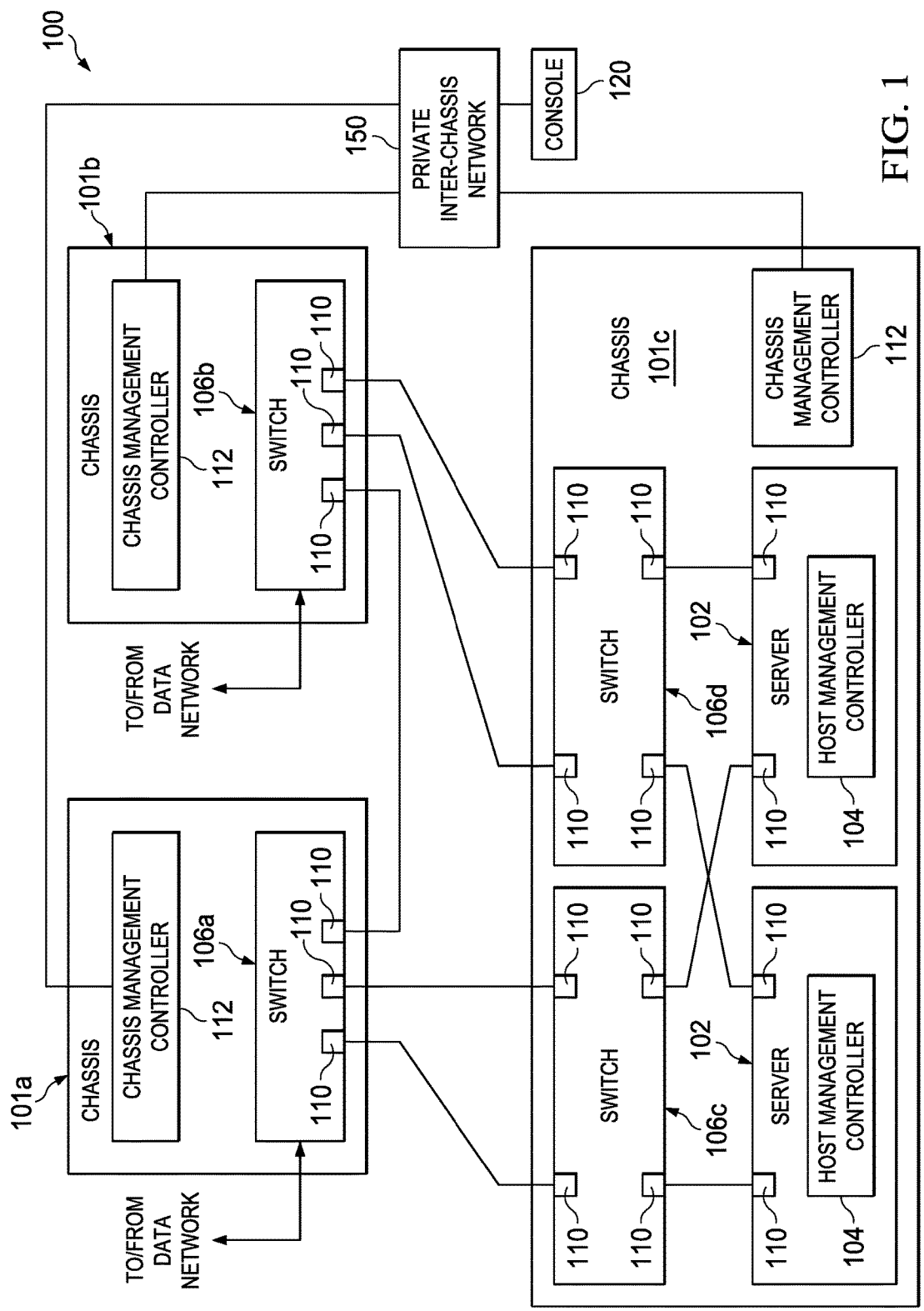
FIG. 1 illustrates a block diagram of a system comprising multiple information handling system chassis, in accordance with embodiments of the present disclosure.
Figure 2:
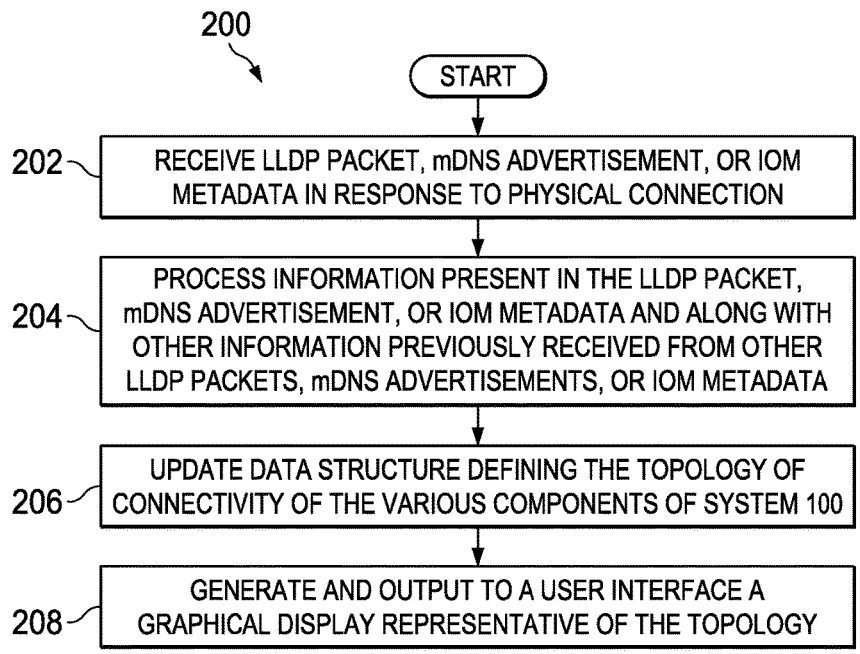
FIG. 2 illustrates a flow chart of an example method for network topology discovery, in accordance with embodiments of the present disclosure.
Figure 3:
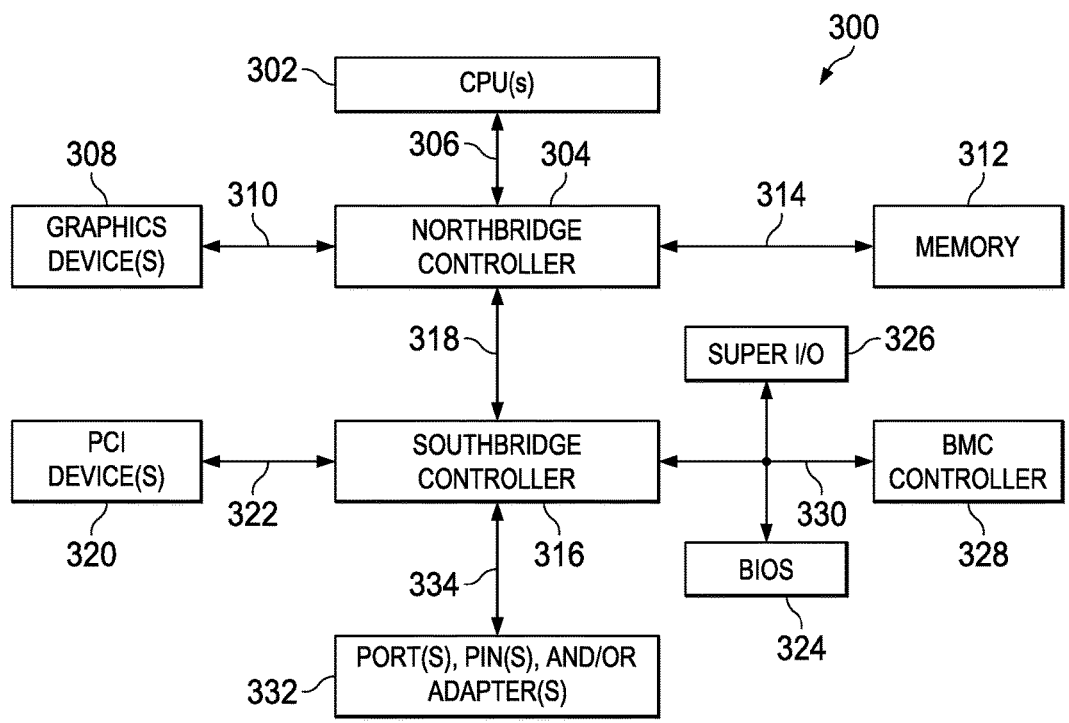
FIG. 3 illustrates a block diagram of an information handling system, in accordance with embodiments of the present disclosure.

Preferred embodiments and their advantages are best understood by reference to FIGS. 1 through 3, wherein like numbers are used to indicate like and corresponding parts. For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various I/O devices, such as a keyboard, a mouse, and a video display. The information handling system may also include one or more buses operable to transmit communication between the various hardware components.

For the purposes of this disclosure, information handling resources may broadly refer to any component system, device or apparatus of an information handling system, including without limitation processors, buses, memories, I/O devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory ("RAM"), read-only memory ("ROM"), electrically erasable programmable read-only memory ("EEPROM"), and/or flash memory; as well as communications media such as wires, optical fibers, microwaves, radio waves, and other electromagnetic and/or optical carriers; and/or any combination of the foregoing.

FIG. 1 illustrates a block diagram of a system 100 comprising multiple information handling system chassis 101, in accordance with embodiments of the present disclosure. As depicted in FIG. 1, system 100 may comprise a plurality of chassis 101 (e.g. chassis 101a, 101b, and 101c), each chassis 101 including information handling systems and/or information handling resources, a private inter-chassis network 150, and a console 120. For example, chassis 101a may include a switch 106a and a chassis management controller 112. As another example, chassis 101b may include a switch 106b and a chassis management controller 112. As a further example, chassis 101c may include switches 106c and 106d, one or more servers 102, and a chassis management controller 112. The various servers 102 and switches 106 may each comprise ports 110 for interfaces with one another, with example connectivity among ports 110 depicted in FIG. 1. For the purposes of clarity and exposition, chassis 101a and 101b are shown without servers (e.g., servers 102). However, in some embodiments, one or both of chassis 101a and 101b may include one or more servers 102.

A server 102 may generally be operable to receive data from and/or communicate data to one or more information handling resources of chassis 101c. In certain embodiments, a server 102 may comprise a blade server having modular physical design. In these and other embodiments, server 102 may comprise an M class server.

Each server 102 may include a host management controller 104. Host management controller 104 may be implemented by, for example, a microprocessor, microcontroller, DSP, ASIC, EEPROM, or any combination thereof. Host management controller 104 may be configured to communicate with chassis management controller 112. Such communication may be made, for example, via a private management network fabric integral to server 102 (not explicitly shown). Host management controller 104 may be configured to provide out-of-band management facilities for management of information handling system 102. Such management may be made by information handling resources of chassis 101 even if information handling system 102 is powered off or powered to a standby state. Host management controller 104 may include a processor, memory, and network connection separate from the rest of information handling system 102. In certain embodiments, host management controller 104 may include or may be an integral part of a baseboard management controller (BMC) or an Integrated Dell Remote Access Controller (iDRAC).

A switch 106 may comprise any suitable system, device, or apparatus for receiving, processing, and forwarding packets. For example, each of switch 106a and 106b may serve as an interface between chassis 101c and a data network and may process and route packets between chassis 101c and such data network. As another example, switches 106c and 106d may each serve as an interface between servers 102 and other chassis 101 (e.g., 101a and 101b) external to chassis 101c.

Each port 110 may comprise a connector, slot, or another interface for receiving one end of a physical connection (e.g., wire, cable) coupled to a corresponding port 110 of another information handling resource.

A chassis management controller 112 may comprise any system, device, or apparatus configured to facilitate management and/or control of system 100 embodied by chassis 101, its information handling systems 102, and/or one or more of its component information handling resources. Chassis management controller 112 may be configured to issue commands and/or other signals to manage and/or control an information handling system 102 and/or information handling resources of system 100. Chassis management controller 112 may comprise a microprocessor, microcontroller, DSP, ASIC, field programmable gate array ("FPGA"), EEPROM, or any combination thereof. In some embodiments, chassis management controller 112 may provide a management console for user/administrator access to these functions. For example, chassis management controller 112 may implement Representational State Transfer ("REST") or another suitable management protocol permitting a user to remotely access chassis management controller 112 to configure system 100 and its various information handling resources. In such embodiments, chassis management controller 112 may interface with a network interface, thus allowing for "out-of-band" control of chassis 101, such that communications to and from chassis management controller 112 are communicated via a management channel physically isolated from an "in-band" communication channel of chassis 101 for which non-management communication may take place. Thus, for example, if a failure occurs in chassis 101 that prevents an administrator from interfacing with chassis 101 via the in-band communication channel or a user interface associated with chassis 101 (e.g., power failure, etc.), the administrator may still be able to monitor and/or manage chassis 101 (e.g., to diagnose problems that may have caused failure) via chassis management controller 112. In the same or alternative embodiments, chassis management controller 112 may allow an administrator to remotely manage one or more parameters associated with operation of chassis 101 and its various information handling resources (e.g., power usage, processor allocation, memory allocation, security privileges, etc.). In some embodiments, chassis management controller 112 may include a management services module. Although beyond the scope of this disclosure, in some embodiments, one of the chassis management controllers 112 of the various chassis 101 may be selected as a "lead" chassis management controller 112, such that an administrator may manage the entirety of system 100 by interfacing with a single chassis management controller 112.

Private inter-chassis network 150 may comprise a network and/or fabric configured to couple information chassis management controllers 112 of the various chassis 101 in system 100 to each other. In these and other embodiments, inter-chassis network 150 may include a communication infrastructure, which provides physical connections, and a management layer, which organizes the physical connections and chassis management controllers 112 communicatively coupled to private inter-chassis network 150. Private inter-chassis network 150 may be implemented as, or may be a part of, an Ethernet local area network (LAN) or any other appropriate architecture or system that facilitates the communication of signals, data, and/or messages.

Console 120 may be communicatively coupled to private inter-chassis network 150 and may comprise an information handling system or a program executable on an information handling system for monitoring and management of the various chassis 101 of system 100 and their various components. For example, as described in greater detail below, console 120 may be able to, based on messages communicated among chassis 101 and management controllers 112, determine the topology of connectivity among the various components of system 100. In some embodiments, console 120 may also be capable of rendering a graphical representation of the topology of connectivity to a user via a user interface (not explicitly shown) of console 120. Although FIG. 1 depicts console 120 as a stand-alone component of system 100, in some embodiments, console 120 may be integral to or otherwise embodied in a chassis management controller 112.

In operation, console 120 may leverage payload information of packets (e.g., Link Layer Discovery Protocol or "LLDP" packets) communicated among switches 106 and/or servers 102 in response to a switch 106 or server 102 being coupled to another device in system 100 and may also leverage advertisements (e.g., multicast Domain Name Service or mDNS) communicated via private inter-chassis network 150 in order to extract information from such payloads and advertisements and process such information to determine topology of connectivity of devices of system 100.

For example, in response to a server 102 being added to system 100, a host management controller 104 of such server may communicate LLDP packets which may be received not only by switches 106c and 106d of the chassis 101c comprising the server 102, but may be also passed-through from switches 106c and 106d to switches 106a and 106b of chassis 101a and 101b, respectively. The payload of each such LLDP packet may include various identifying information, including without limitation identifying information (e.g., service tag or serial number) of the server 102 from which the LLDP packet originated, identifying information (e.g., service tag or serial number) of the chassis 101 comprising the server 102, identifying information (e.g., fully-qualified device descriptor) of the port 110 of the server 102 originating the LLDP packet, and the switch fabric (e.g., 106c or 106d) to which the packet-originating port 110 is coupled. Thus, based on such payload, a console 120 may be able to determine the chassis 101 housing the server 102, a switch fabric to which the server 102 is coupled, and connectivity between the server 102 and a switch 106 receiving the LLDP packet external to the chassis 101.

As another example, chassis management controllers 112 may communicate mDNS advertisements on private inter-chassis network 150. Such advertisements may include various identifying information, including without limitation identifying information (e.g., service tag or serial number) of a chassis 101 including a switch fabric, identifying information (e.g., slot number) of a switch 106 of the switch fabric, and a switch type for the switch 106. Accordingly, console 120 may correlate such information from mDNS advertisements to the information from LLDP payloads to determine the switch type of each switch fabric.

As a further example, a switch 106 may include metadata information (e.g., an I/O module or "IOM" descriptor file) that is specific to a switch type and uplink (e.g., connectivity between a server and switch 106c/106d) and downlink connectivity (connectivity between a switch 106c/106d and a switch 106a/106b) of a switch 106. Accordingly, console 120 may correlate such IOM metadata information to information from mDNS advertisements and/or information from LLDP payloads to determine the complete topology of each switch fabric.

Inter-switch connectivity (e.g., between switches 106a and 106b) and external network connectivity (e.g., between an external data network and switches 106a/106b) may be determined based on LLDP payloads communicated between switches (e.g., between switches 106a and 106b) and between individual switches (e.g., between switches 106a and 106b) and the external data network.

FIG. 2 illustrates a flow chart of an example method 200 for network topology discovery, in accordance with embodiments of the present disclosure. According to some embodiments, method 200 may begin at step 202. As noted above, teachings of the present disclosure may be implemented in a variety of configurations of system 100. As such, the preferred initialization point for method 200 and the order of the steps comprising method 200 may depend on the implementation chosen.

At step 202, console 120 may receive an LLDP packet, mDNS advertisement, or IOM metadata in response to a physical connection being made in system 100. At step 204, console 120 may process information present in the LLDP packet, mDNS advertisement, or IOM metadata and along with other information previously received from other LLDP packets, mDNS advertisements, or IOM metadata. At step 206, based on such processing, console 120 may update a table, list, map, database, or other data structure defining the topology of connectivity of the various components of system 100. At step 208, in some embodiments, console 120 may generate and output to a user interface a graphical display representative of the topology.

Although the foregoing contemplates that console 120 receives various traffic, it is noted that console 120 may not receive all of such traffic (e.g., console 120 may not receive LLDP packets). Instead, a switch 106 may receive LLDP packets and determine topology based on such packets. Thus, a complete topology of a system may be determined by the aggregate of traffic received by switches 106 and console 120.

Although FIG. 2 discloses a particular number of steps to be taken with respect to method 200, method 200 may be executed with greater or lesser steps than those depicted in FIG. 2. In addition, although FIG. 2 discloses a certain order of steps to be taken with respect to method 200, the steps comprising method 200 may be completed in any suitable order.

Method 200 may be implemented using system 100, and/or any other system operable to implement method 200.

In certain embodiments, method 200 may be implemented partially or fully in software and/or firmware embodied in computer-readable media.

FIG. 3 illustrates a block diagram of an information handling system 300, in accordance with embodiments of the present disclosure. Information handling system 300 is an instance of console 120 and/or a server 102 illustrated in FIG. 1. As shown, information handling system 300 includes one or more CPUs 302. In various embodiments, information handling system 300 may be a single-processor system including one CPU 302, or a multi-processor system including two or more CPUs 302 (e.g., two, four, eight, or any other suitable number). CPU(s) 302 may include any processor capable of executing program instructions. For example, in various embodiments, CPU(s) 302 may be general-purpose or embedded processors implementing any of a variety of instruction set architectures (ISAs), such as the x86, POWERPC, ARM, SPARC, or MIPS ISAs, or any other suitable ISA. In multi-processor systems, each of CPU(s) 302 may commonly, but not necessarily, implement the same ISA. In such an embodiment, a motherboard may be configured to provide structural support, power, and electrical connectivity between the various aforementioned components. Such a motherboard may include multiple connector sockets in various configurations, adapted to receive pluggable circuit cards, component chip packages, etc.

CPU(s) 302 are coupled to northbridge controller or chipset 304 via front-side bus 306. Northbridge controller 304 may be configured to coordinate I/O traffic between CPU(s) 302 and other components. For example, in this particular implementation, northbridge controller 304 is coupled to graphics device(s) 308 (e.g., one or more video cards or adaptors, etc.) via graphics bus 310 (e.g., an Accelerated Graphics Port or AGP bus, a Peripheral Component Interconnect or PCI bus, etc.). Northbridge controller 304 is also coupled to system memory 312 via memory bus 314. Memory 312 may be configured to store program instructions and/or data accessible by CPU(s) 302. In various embodiments, memory 312 may be implemented using any suitable memory technology, such as static RAM (SRAM), synchronous dynamic RAM (SDRAM), nonvolatile/Flash-type memory, or any other type of memory.

Northbridge controller 304 is coupled to southbridge controller or chipset 316 via internal bus 318. Generally, southbridge controller 316 may be configured to handle various of computing device information handling system 300's I/O operations, and it may provide interfaces such as, for instance, Universal Serial Bus (USB), audio, serial, parallel, Ethernet, etc., via port(s), pin(s), and/or adapter(s) 332 over bus 334. For example, southbridge controller 316 may be configured to allow data to be exchanged between information handling system 300 and other devices, such as other information handling systems attached to a network. In various embodiments, southbridge controller 316 may support communication via wired or wireless general data networks, such as any suitable type of Ethernet network, for example; via telecommunications/telephony networks such as analog voice networks or digital fiber communications networks; via storage area networks such as Fiber Channel SANs; or via any other suitable type of network and/or protocol.

Southbridge controller 316 may also enable connection to one or more keyboards, keypads, touch screens, scanning devices, voice or optical recognition devices, or any other devices suitable for entering or retrieving data. Multiple I/O devices may be present in information handling system 300. In some embodiments, I/O devices may be separate from information handling system 300 and may interact with information handling system 300 through a wired or wireless connection. As shown, southbridge controller 316 is further coupled to one or more PCI devices 320 (e.g., modems, network cards, sound cards, video cards, etc.) via PCI bus 322. Southbridge controller 316 is also coupled to Basic I/O System (BIOS) 324, Super I/O Controller 326, and Baseboard Management Controller (BMC) 328 via Low Pin Count (LPC) bus 330.

BIOS 324 includes non-volatile memory having program instructions stored thereon. Those instructions may be usable for CPU(s) 302 to initialize and test other hardware components and/or to load an Operating System (OS) onto information handling system 300. As such, BIOS 324 may include a firmware interface that allows CPU(s) 302 to load and execute certain firmware, as described in more detail below. In some cases, such firmware may include program code that is compatible with the Unified Extensible Firmware Interface (UEFI) specification, although other types of firmware may be used.

BMC controller 328 may include non-volatile memory having program instructions stored thereon that are usable by CPU(s) 302 to enable remote management of information handling system 300. For example, BMC controller 328 may enable a user to discover, configure, and manage BMC controller 328, setup configuration options, resolve and administer hardware or software problems, etc. Additionally or alternatively, BMC controller 328 may include one or more firmware volumes, each volume having one or more firmware files used by the BIOS' firmware interface to initialize and test components of information handling system 300.

Super I/O Controller 326 combines interfaces for a variety of lower bandwidth or low data rate devices. Those devices may include, for example, floppy disks, parallel ports, keyboard and mouse, temperature sensor and fan speed monitoring, etc. For example, the super I/O controller 326 may be coupled to the one or more upstream sensors and to the one or more downstream sensors.

In some cases, information handling system 300 may be configured to access different types of computer-accessible media separate from memory 312. Generally speaking, a computer-accessible medium may include any tangible, non-transitory storage media or memory media such as electronic, magnetic, or optical media—e.g., magnetic disk, a hard drive, a CD/DVD-ROM, a Flash memory, etc. coupled to information handling system 300 via northbridge controller 304 and/or southbridge controller 316.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
    a processor;
    a memory coupled to the processor, the memory having program instructions stored thereon that, upon execution by the processor, cause the processor to:
        responsive to a physical connection being made between components of a system comprising multiple information handling system chassis, receive a first message comprising a Link Layer Discovery Protocol packet and a second message comprising a multicast Domain Name Service advertisement;
        combine and process information present in the first and second messages indicative of a topology of connectivity among the components of the system; and
        update a data structure defining the topology of connectivity of the components of the system based on the combined and processed information.

2. The information handling system of claim 1, the instructions for further causing the processor to generate a graphical display to a user interface representative of the topology of connectivity.

3. The information handling system of claim 1, the instructions for further causing the processor to update the data structure based on the information present in the first and second messages and previous messages generated in response to other physical connections being made between components of the system.

4. The information handling system of claim 1, wherein the second message comprises a message communicated from another information handling system integral to a first one of the multiple information handling system chassis to a second one of the multiple information handling system chassis.

5. The information handling system of claim 1, wherein the Link Layer Discovery Protocol packet includes at least one service tag or serial number.

6. The information handling system of claim 1, wherein the second message comprises an advertisement communicated on a private inter-chassis network communicatively coupled to each of the multiple information handling system chassis, wherein the private inter-chassis network is configured to carry network traffic for managing the multiple information handling system chassis.

7. The information handling system of claim 1, wherein the multicast Domain Name Service advertisement includes at least one service tag or serial number.

8. The information handling system of claim 1, wherein at least one of the first message and the second message comprises metadata associated with a switch fabric.

9. The information handling system of claim 1, wherein at least one of the first message and the second message comprises an input/output module descriptor file.

10. A method comprising:
    responsive to a physical connection being made between components of a system comprising multiple information handling system chassis, receiving a first message comprising a Link Layer Discovery Protocol packet and a second message comprising a multicast Domain Name Service advertisement;
    combining and processing information present in the first and second messages indicative of a topology of connectivity among the components of the system; and
    updating a data structure defining the topology of connectivity of the components of the system based on the combined and processed information.

11. The method of claim 10, further comprising generating a graphical display to a user interface representative of the topology of connectivity.

12. The method of claim 10, further comprising updating the data structure based on the information present in the first and second messages and previous messages generated in response to other physical connections being made between components of the system.

13. The method of claim 10, wherein the second message comprises a message communicated from another information handling system integral to a first one of the multiple information handling system chassis to a second one of the multiple information handling system chassis.

14. The method of claim 10, wherein the Link Layer Discovery Protocol packet is received at a switch of the system, wherein the multicast Domain Name Service advertisement is received at a console of the system, and wherein the data structure is updated based on an aggregation of traffic received at the switch and the console.

15. The method of claim 10, wherein the second message comprises an advertisement communicated on a private inter-chassis network communicatively coupled to each of the multiple information handling system chassis, wherein the private inter-chassis network is configured to carry network traffic for managing the multiple information handling system chassis.

16. The method of claim 10, wherein the multicast Domain Name Service advertisement includes at least one service tag or serial number of the system.

17. The method of claim 10, wherein at least one of the first message and the second message comprises metadata associated with a switch fabric.

18. The method of claim 10, wherein at least one of the first message and the second message comprises an input/output module descriptor file.

19. An article of manufacture comprising:
    a non-transitory computer readable medium; and
    computer-executable instructions carried on the computer readable medium, the instructions readable by a processor, the instructions, when read and executed, for causing the processor to:
        responsive to a physical connection being made between components of a system comprising multiple information handling system chassis, receive a first message comprising a Link Layer Discovery Protocol packet and a second message comprising a multicast Domain Name Service advertisement;
        combine and process information present in the first and second messages indicative of a topology of connectivity among the components of the system; and update a data structure defining the topology of connectivity of the components of the system based on the combined and processed information.

20. The article of claim 19, the instructions for further causing the processor to generate a graphical display to a user interface representative of the topology of connectivity.

\* \* \* \* \*